(12) United States Patent  (10) Patent No.: US 11,950,613 B1
Jenkins  (45) Date of Patent: Apr. 9, 2024

(54) FOOD PRESERVATION SYSTEM

(71) Applicant: Andrew David Jenkins, Atlanta, GA (US)

(72) Inventor: Andrew David Jenkins, Atlanta, GA (US)

( * ) Notice: Subject to any disclaimer, the term of this patent is extended or adjusted under 35 U.S.C. 154(b) by 0 days.

(21) Appl. No.: 18/386,926

(22) Filed: Nov. 3, 2023

Related U.S. Application Data

(63) Continuation of application No. 18/379,218, filed on Oct. 12, 2023, now abandoned.

(51) Int. Cl.
*A23L 3/3409* (2006.01)
*A23B 7/144* (2006.01)
*A23B 9/18* (2006.01)
*A23L 3/00* (2006.01)
*B65B 25/00* (2006.01)
*B65D 81/28* (2006.01)
*G06V 20/68* (2022.01)
*A23B 4/16* (2006.01)

(52) U.S. Cl.
CPC ............ *A23L 3/3409* (2013.01); *A23B 7/144* (2013.01); *A23B 9/18* (2013.01); *A23L 3/001* (2013.01); *A23L 3/003* (2013.01); *B65B 25/001* (2013.01); *B65D 81/28* (2013.01); *G06V 20/68* (2022.01); *A23B 4/16* (2013.01)

(58) Field of Classification Search
CPC ...... A23L 3/001; A23L 3/3409; A23L 3/3418; A23L 3/3445; A23B 4/16; A23B 5/10; A23B 7/144; A23B 7/148; A23B 7/152; A23B 9/18; A23B 9/20; A23B 9/22
See application file for complete search history.

(56) References Cited

U.S. PATENT DOCUMENTS

| 10,836,551 | B1 * | 11/2020 | Mir | B65D 77/206 |
| 2011/0072764 | A1 * | 3/2011 | Daniek | B26D 7/2614 |
| | | | | 53/556 |
| 2023/0046266 | A1 * | 2/2023 | Bowden | A23L 3/3427 |

FOREIGN PATENT DOCUMENTS

WO  WO-2005080205 A1 * 9/2005 ............... A23B 9/18

* cited by examiner

*Primary Examiner* — Reginald Alexander
(74) *Attorney, Agent, or Firm* — The Law Firm of AQ Basit; Abdul Q Basit

(57) ABSTRACT

An apparatus, comprising a camera, a motion sensor, a receiving section, gas tanks, a screen, and a computing device. The computing device is configured to control the camera to take electronic images, determine a type of food placed in a particular container, determine an amount of gas and a type of gas to fill the particular container, generate an electronic message to request placement of the particular container onto the receiving section, and inject gas into the particular container when the particular container is placed onto the receiving section. The injected gas is used to preserve food inside the container.

6 Claims, 16 Drawing Sheets

| FOOD TYPE (502) | FOOD AGE (504) | FOOD SIZE (506) | GAS/GAS MIXTURE (508) | SIZE (510) | TYPE (512) | FLUSH (514) |
|---|---|---|---|---|---|---|
| BANANA | DAY | 1 OZ | Argon | 5 OZ | GLASS | 2 |
| FISH | HOUR | 6 OZ | CO2 | 1 CUP | PLASTIC | 4 |
| SALSA | WEEK | 10 OZ | N2 | 12 cubic inches | ZIP LOCK | 1 |
| ● ● | ● ● | ● ● | ● ● | ● ● | ● ● | ● ● |

FIG. 5

FOOD PRESERVATION SYSTEM

BACKGROUND

Food preservation is a common practice in the food processing industry. One process of preserving food includes the use of gases. Different gases may be used to preserve different types of foods, such as one mixture of gases for potato chips and a different mixture of gases for prepackaged salads.

There is currently no single device that provides different gases for different foods without any need for the user to have knowledge of determining what gas or mixture of gases is needed to preserve a particular food.

BRIEF DESCRIPTION OF DRAWINGS

FIG. 5 is a diagram of an example database;

DETAILED DESCRIPTION OF PREFERRED EMBODIMENTS

Figure 1:
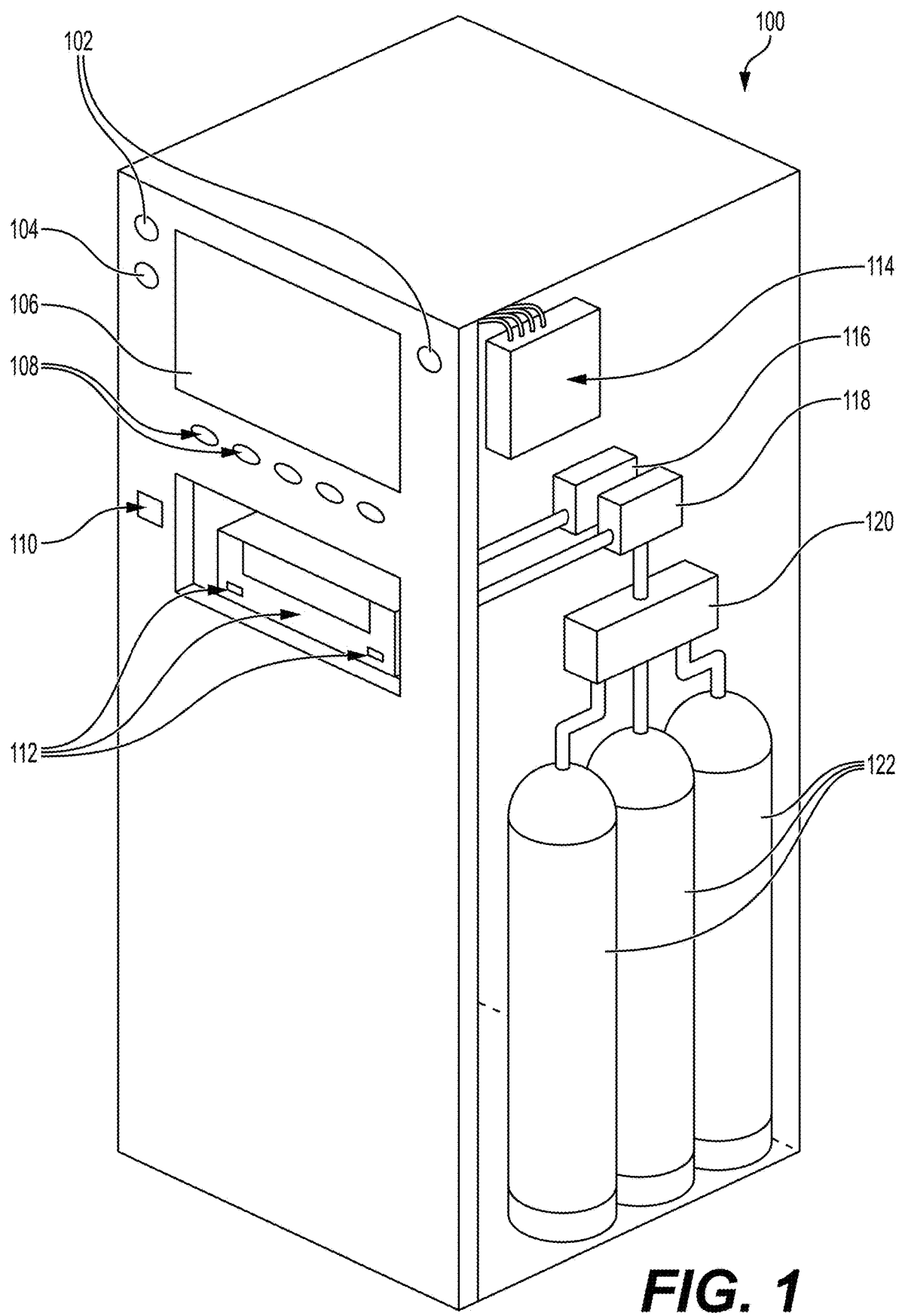
FIG. 1 is a diagram of an example food preservation system.

The following detailed description refers to the accompanying drawings. The same reference numbers in different drawings may identify the same or similar elements.

Systems, devices, and/or methods described herein may allow for automatically determining a mixture of gases for different types of foods and/or liquids. In embodiments, the systems, devices, and/or methods described herein can reduce food waste and allow for usage at home or in a commercial business setting that does not require any expertise on the part of the user. For example, the systems, devices, and/or methods described herein can be used in a restaurant without any requirement for a restaurant employee to know what gases are required for a particular food.

In embodiments, a food container may be analyzed by an apparatus (e.g., apparatus 100 as described in FIG. 1) that has various computing systems that allow for the apparatus to determine characteristics of the food and then determine the type and quantity of gas and/or gases required for the system. In embodiments, the computing systems associated with the apparatus may determine based on stored information the type of food. In embodiments, such stored information may be based on electronic information stored in a computing system as well as electronic information received about previous foods that have been analyzed by the apparatus for the purposes of determining a gas or a mixture of gases for food preservation. In embodiments, the food container may be any type of container that can hold food, such as a plastic bag, a plate, or any other type of container that permits the apparatus to take an image of the food.

Thus, the food preservation system described herein, has a number of features and benefits that includes: (a) having an electronic system that can visually determine the food when an image is taken of the food, (b) the use of artificial intelligence (AI) to assist in the determination of the food, (c) create different types and quantities of mixture of gases for different foods and different containers, (d) mixing gases from different tanks that are part of the food preservation system, (e) using software that can take into consideration various variables, such as container type, container fullness, and temperature, (f) having a database about various gases to develop and execute a gas fill process unique to each specific container and food, and (g) an outbound, real time gas testing system to determine if the gas in the container has reached a desired mixture.

In embodiments, a food container may include specially designed food storage containers that have special lids designed specifically to make replacing the gas inside the storage container more efficient. In embodiments, the food container, with the specially designed lid, may be inserted into the apparatus (e.g., placed in a slot or holding area). In embodiments, the apparatus may then automatically open the special lid, use the identification of the food to determine the type and quantity of gas, and inject the particular gas into the container.

In embodiments, the food container lid is designed so that when the combo cap arm is in the locked position, the lid is flat to allow stacking in the refrigerator. Thus, the food container lid, described herein, has a number of benefits, that includes (a) covering of inbound and outbound fill ports when gas is not being inputted into the food container, (b) directing replacement gas into the food container more efficiently, and (c) automatically opening and closing the lid based on placing the food container in the food preservation system (e.g., apparatus 100).

As will be described below, an alternate food container lid may include a gas reservoir system. In embodiments, the gas reservoir system overcomes the problem of when any gas will cool and contract when that particular food container is placed inside a refrigerated space. By having a gas reservoir system as part of the food container lid, the amount of gas inside the food container lid is maintained. However, the apparatus described herein may be used to fill container that do not have any specific type of lid. For example, the container may be a sandwich bag or a container with a slidable lid or twistable lid.

Thus, the systems, methods, and/or devices described herein allow for an automated way for preserving food without any specialized knowledge on the part of the user who is placing the food container in the food preservation system.

FIG. 1 is a diagram of an example apparatus 100. In embodiments, apparatus 100 may be a food preservation system. As shown in FIG. 1, apparatus 100 includes camera 102, scan button 104, screen 106, mix buttons 108, motion sensor 110, receiving section 112, computing system 114, outbound gas tester 116, inbound gas tester 118, mixing valve 120, and tanks 122.

In embodiments, apparatus 100 is a food preservation system that inserts one or more gases into a container of food. As shown in FIG. 1, camera 102 may be one or more devices (as shown in FIG. 1) that can take electronic imagery of food. In embodiments, camera 102 may capture multimedia content (e.g., a still image, a video of any particular length of time, etc.) of the item when an item is a particular distance from apparatus 100 (as determined by motion sensor 110). In alternate embodiments, camera 102 may be placed inside receiving section 112 and taken an electronic image when the container is placed into receiving section 112 of apparatus 100. In embodiments, camera 102 may automatically adjust the direction of its lens to take an image of the food (and food container). In embodiments, camera 102 may automatically take an image of the food (based on motion sensor 110) or may take an image once a user of apparatus 100 presses/touches scan button 104. Either way, camera 102 takes an electronic image.

In embodiments, screen 106 is a graphical user interface that displays electronic information to the user. In embodiments, screen 106 may be a touch screen that allows for a user of apparatus 100 to electronically interact with apparatus 100. In embodiments, screen 106 may display graphical features, words, imagery, etc. In embodiments, screen 106 may also be associated with speakers or other systems that generate sound from apparatus 100. For example, screen 106 may display instructions to the user to when to place a food container into receiving section 112, instructions on when to take the food container out of receiving section 112, and/or any other type of information. In alternate embodiments, screen 106 may include an electronic selection feature (e.g., an icon) that allows for starting the process of camera 102 to take an electronic image without the need for scan button 104. In other embodiments, screen 106 may be associated with a microphone or any other type of voice recognition system that can receive audible sound from a user which can then converted to electronic communications for use by apparatus 100. In embodiments, screen 106 may be a separate device and may communicate wirelessly with apparatus 100.

In embodiments, mix buttons 108 may be one or more buttons that can be used by a user of apparatus 100 to provide electronic communications to apparatus 100 on which gas or gas mixtures are needed. In embodiments, mix buttons 108 provide for a determination by the user of apparatus 100 rather than requiring the use of camera 102 to determine the requirements of gas inputs into a particular container. In alternate embodiments, mix buttons 108 may be touch screen selections on screen 106.

In embodiments, computing system 114 is a computing device that can electronically determine food identified via electronic imagery captured by camera 102. In embodiments, computing system 114 may include software and/or other features that control camera 102, scan button 104, screen 106, mix buttons 108, motion sensor 110, receiving section 112, outbound gas tester 116, inbound gas tester 118, mixing valve 120, and tanks 122. In embodiments, computing system 114 features are further described in FIG. 3. In embodiments, piping may connect receiving section 112, outbound gas tester 116, inbound gas tester 118, mixing valve 120, and tanks 122 with each other. In embodiments, the piping may be made of plastic, metal, or any other material that allows for gas to travel from tanks 122 through various valves and into a food container. In embodiments, the piping may be rigid or flexible in its shape. In embodiments, a nozzle/pipe may be provided all the way to a fill port (such as described in FIGS. 8A and 8B) in receiving section 112 that sends gas to a container.

In embodiments, outbound gas tester 116 is an electro-mechanical device that measures the amount of gas being sent out (i.e., exhausting out) of a container. In embodiments, inbound gas tester 118 that measures the amount of gas being sent (via mixing valve 120 and tanks 122) into the container. In embodiments, the measurement information from outbound gas tester 116 and inbound gas tester 118 may be the used by computing system 114 to determine when to stop sending gas from one more tanks 122 and also when to shut off mixing valve 120. For example, if argon gas is being sent into a container from tanks 122, inbound gas tester 118 measures the amount of argon gas inside the container. At the same time, in this non-limiting example, outbound gas tester 116 measures the amount of air, oxygen, or any other gas that is leaving the container. Thus, in this non-limiting example, when the container has 98% argon and 98% of the air in the container (located at receiving section 112) has been removed, then this information from outbound gas tester 116 and inbound gas tester 118 may be used by computing device 114 to shut off tanks 122 and/or mixing valve 120. In embodiments, inbound gas tester 118 may also have a pressure gauge that measures the amount of gas in tanks 122 so as to determine when one or more tanks 122 are empty and are to be replaced with new tanks.

In embodiments, mixing valve 120 may be an electro-mechanical valve that permits to mix gases from two or more tanks when a mixture of gases is required for food preservation. In embodiments, mixing valve 120 may receive electronic communications from computing device 114. In embodiments, tanks 122 may be one or more tanks that can hold gases that can be used for food preservation. In embodiments, tanks 122 may have a particular volume and pressure requirements.

While apparatus 100 is shown with multiple features, one or more of these features may not be required. For example, motion sensor 110 could start apparatus 100 without the need of scan button 104. In other embodiments, mix buttons 108 may not require any AI or database usage to determines the food in the container. In other embodiments, outbound gas tester 116 could be removed and apparatus 100 may use more gas in the filling process to compensate for the lack of information. In other embodiments, different types of gas that are needed for different types of foods may be prepackaged premixed gas cylinders (tanks 122). Accordingly, apparatus 100 could then provide reduced food preservation at a lower cost since computing device 114 does not require sending electronic communications to mixing valves or the need of mixing valves (such as mixing valve 120).

Figure 2:
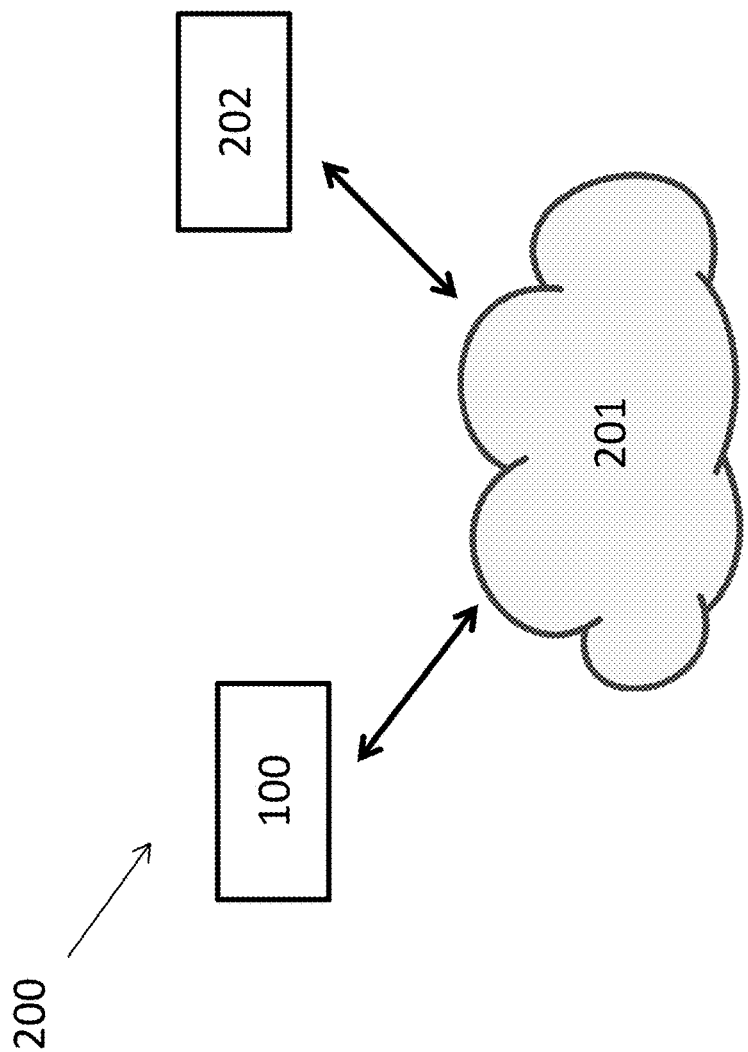
FIG. 2 is a diagram of a network environment.

FIG. 2 is a diagram of example environment 200 in which systems, devices, and/or methods described herein may be implemented. FIG. 2 shows network 201, apparatus 100, and database 202. Network 201 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks.

Additionally, or alternatively, network 201 may include a cellular network, a public land mobile network (PLMN), a second generation (2G) network, a third generation (3G) network, a fourth generation (4G) network, a fifth generation (5G) network, and/or another network. In embodiments, network 122 may allow for devices describe in any of the figures to electronically communicate (e.g., using emails, electronic signals, URL links, web links, electronic bits, fiber optic signals, wireless signals, wired signals, etc.) with each other so as to send and receive various types of electronic communications. In embodiments, network 201 may include a cloud network system that incorporates one or more cloud computing systems.

Apparatus 100 may include any computation or communications device that is capable of communicating with a network (e.g., network 201). Apparatus 100 is described in FIG. 1 and may include additional features described herein. For example, apparatus 100 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, or another type of computation or communications device.

Apparatus 100 may receive and/or display electronic content. In embodiments, the electronic content may include objects, data, images, audio, video, text, files, and/or links to files accessible via one or more networks. Content may include a media stream, which may refer to a stream of electronic content that includes video content (e.g., a video stream), audio content (e.g., an audio stream), and/or textual content (e.g., a textual stream). In embodiments, an electronic application may use an electronic graphical user interface to display content and/or information via apparatus 100. Apparatus 100 may have a touch screen and/or a keyboard that allows a user to electronically interact with an electronic application or a webpage (either containing electronic content). In embodiments, a user may swipe, press, or touch a portion of apparatus 100 in such a manner that one or more electronic actions will be initiated by apparatus 100 via an electronic application.

Database 202 may include any computation or communications device that store electronic information about multiple foods and/or containers. In embodiments, database 202 may store electronic information about food types, textures, food sizes, age of food, types of gases associated with particular sizes and types of foods, types of gas mixes associated with particular sizes and types of foods. Furthermore, database 202 may include electronic information about the number of times a particular gas/gas mixtures is to be injected (e.g. number of times to flush) a container with the particular gas/gas mixture. For example, the electronic information may indicate injection into a container argon gas three times or flush a container with 50% argon and 50% nitrogen.

Figure 3:
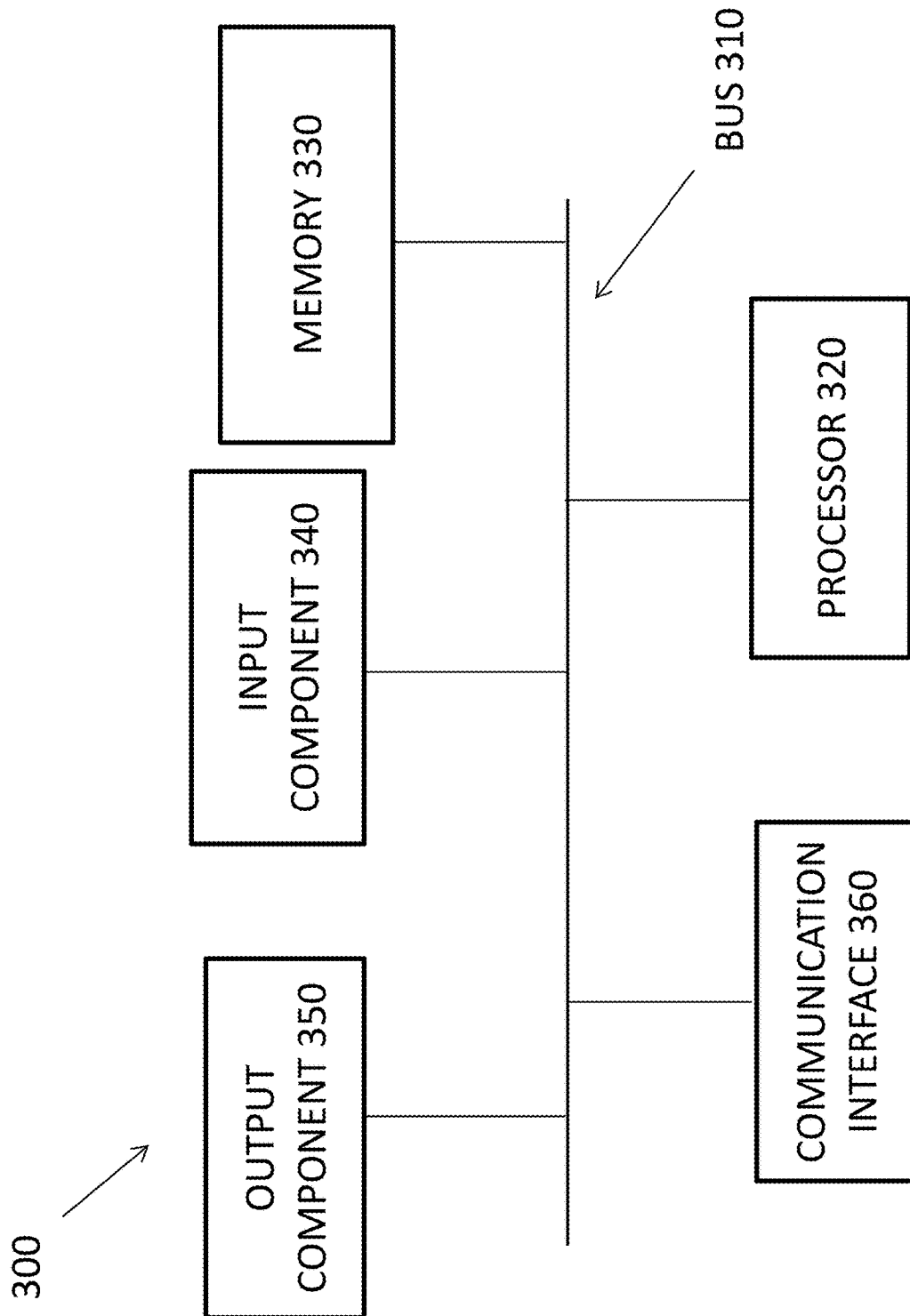
FIG. 3 is a diagram of an example computing device.

FIG. 3 is a diagram of example components of a device 300. Device 300 may correspond to network 201, apparatus 100, computing system 114, and/or database 202. Alternatively, or additionally, network 201, apparatus 100, computing system 114, and/or database 202 may include one or more devices 300 and/or one or more components of device 300.

As shown in FIG. 3, device 300 may include a bus 310, a processor 320, a memory 330, an input component 340, an output component 350, and a communications interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communications among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320. Input component 340 may include a mechanism that permits a user to input information to device 300, such as a keyboard, a keypad, a button, a switch, voice command, etc. Output component 350 may include a mechanism that outputs information to the user, such as a display, a speaker, one or more light emitting diodes (LEDs), etc.

Communications interface 360 may include any transceiver-like mechanism that enables device 300 to communicate with other devices and/or systems. For example, communications interface 360 may include an Ethernet interface, an optical interface, a coaxial interface, a wireless interface, or the like. In another implementation, communications interface 360 may include, for example, a transmitter that may convert baseband signals from processor 320 to radio frequency (RF) signals and/or a receiver that may convert RF signals to baseband signals. Alternatively, communications interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 360 and transmit the RF signals over the air, and receive RF signals over the air and provide the RF signals to communications interface 360. In one implementation, for example, communications interface 360 may communicate with network 201.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
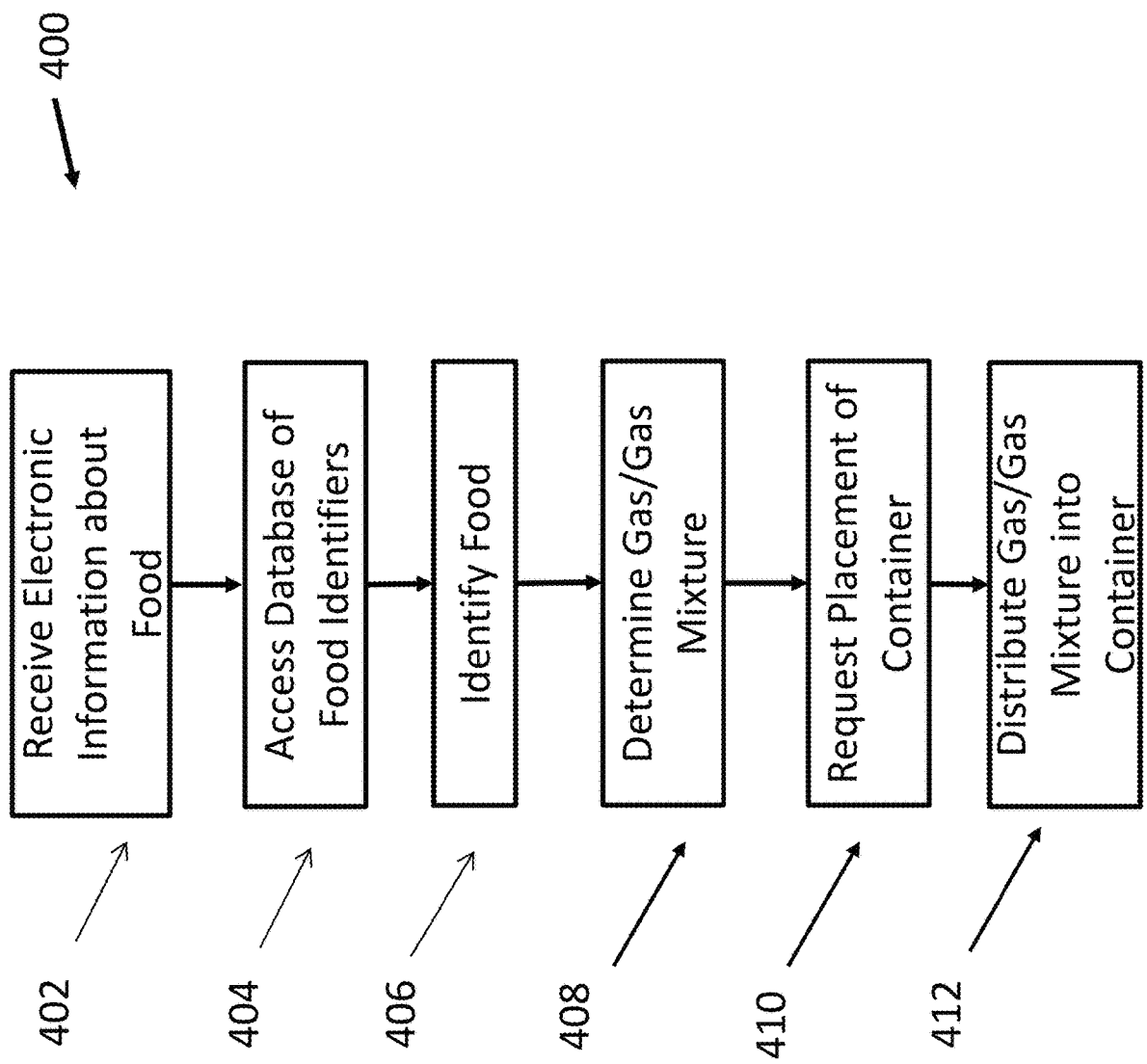
FIG. 4 is an example flow diagram.

FIG. 4 is an example flow diagram of process 400 for determining a quantity of gas or gas mixture to be inputted into a food container. In embodiments, example process 400 may be performed by apparatus 100. For FIG. 4, the order of the blocks may be modified in other implementations. Further, non-dependent blocks may be performed in parallel.

At step 402, apparatus 100 receives electronic information about a particular food item. In embodiments, apparatus 100 may receive the electronic information based on electronic imagery from a camera (e.g., camera 102) associated with apparatus 100. In embodiments, apparatus 100 may receive the electronic imagery when a user selects scan button 104 or apparatus 100 using the camera to automatically take the electronic image when motion sensor 110 senses that a container is in a particular location for taking the electronic image. In embodiment, the electronic information about the particular food item also includes electronic information about the container that the particular food item is enclosed in. In embodiments, apparatus 100 may also receive temperature information about the particular food item if the food item (in the container) is placed in receiving section 112. In embodiments, apparatus 100 may include an infrared camera or a thermometer that can obtain temperature information about the food item. In embodiments, the infrared camera or thermometer may be installed inside receiving section 112. In alternate embodiments, apparatus 100 may receive electronic information inputted by the user via a keyboard or touchscreen. For example, the user may type in "half apple" on screen 106 without the need for apparatus 100 to use a camera. Alternatively, apparatus 100 may scan a QR code from a user device (e.g., a smartphone) that provides information about the type of food.

At step 404, apparatus 100 accesses a database which includes electronic information is associated with imagery of different types of food products. In embodiments, the database (similar to database 500 described in FIG. 5) includes electronic information about various characteristics of food such as type of food, state of the food (sliced, peeled, etc.), texture of food, food decay times associated with different types of food, food decay times associated with the temperature of the food. In embodiments, apparatus 100 can also access electronic information from a database (e.g., database 500) about particular types of containers. For example, the electronic information about containers may include information on the material of the container (e.g., glass, plastic, etc.), the size of the container, the shape of the container (e.g., cylindrical, irregular, bag, square, etc.). In embodiments, apparatus 100 may also use the electronic imagery of the food and container to determine to amount of food stored in the container (e.g., percentage of volume filled with food inside the container).

At step 406, apparatus 100 identifies the type of food, the type of container, and other characteristics associated with the type of food and type of container. For example, apparatus 100 may determine that the type of food is sliced bananas placed in a glass container where the sliced bananas take up 30% volume of the glass container. In another example, apparatus 100 may determine that the type of food is guacamole placed in a sandwich bag and taking up 50% volume of the sandwich bag.

At step 408, apparatus 100 determines the type of gas or mixture of gases that will be injected into the container identified in step 406. In embodiments, apparatus 100 may determine that only a single type of gas is required or may determine that a mixture of gases is required. For example, apparatus 100 may determine that carbon dioxide is only needed. In another example, apparatus 100 may determine that a mixture of 40% argon and 60% nitrogen is required. In embodiments, apparatus 100 may determine the amount of gas, or mixture of gases, required for the combination of the food and container type. In embodiments, apparatus 100 may determine that the amount of gas, or mixture of gases, should take up 5% of the container volume.

At step 410, apparatus 100 generates an electronic message to request a user to place the container in the receiving section 112. In embodiments, apparatus 100 may display an electronic message on screen 106. Additionally or alternatively, the electronic message generated by apparatus 100 may provide an audible sound or spoken words that requests the user to place the container in the receiving section 112.

At step 412, apparatus 100 distributes gas or a mixture of gases into the container placed in receiving section 112. In embodiments, apparatus 100 has an injection mechanism that injects/distributes gas, or a mixture of gases, into the container. In embodiments, apparatus 100 may open one or more valves from one or more tanks 122. In embodiments, if more than one gas is being used (i.e., a mixture of gases), apparatus 100 sends an electronic communication to mixing valve 120 to mix different gases. In embodiments, apparatus 100 also receives electronic communications from outbound gas tester 116 and inbound gas tester 118. In embodiments, outbound gas tester 116 determines how much gas is being out of the container. In embodiments, inbound gas tester 118 determines how much gas or air is being sent into the container. Thus, the combination of electronic communications from outbound gas tester 116 and inbound gas tester 118 to computing system 114 (of apparatus 100) are used to determine when to send additional electronic communications to the mixing valve or other valves to shut off gas supply from one or more tanks 122.

FIG. 5 is an example database 500. In embodiments, database 500 may be similar to the database described in FIG. 2. As shown in FIG. 5, database 500 includes food type 502, food age 504, food size 506, gas/gas mixture 508, container size 510, container type 512, and flushing quantities 514. In embodiments, database 500 may be part of computing system 114 or may be remote from apparatus 100 but being in electronic communication with apparatus 100. In embodiments, database 500 may receive electronic information from apparatus 100 (e.g., via electronic imagery taken by camera 102) or from other sources. For example, there may be multiple apparatus 100s that are communication with each other and share electronic information on food and containers.

As shown in FIG. 5, food type 502 may include multiple data fields with each data field storing information about food types such as, for example, banana, fish, and salsa. As shown in FIG. 5, food age 504 may include multiple data fields with each data field storing information about food age (based off images of food received by apparatus 100), such as one hour, one day, etc. As shown in FIG. 5, food size 506 may include multiple data fields with each data field storing information about the amount food stored in a container, such as ounces, cup, and cubic inches. As shown in FIG. 5, gas/gas mixture 508 may include multiple data fields with each data field storing information about the gas or gas mixture that is related to the type of food, amount of food, and/or the size and type of container (described in data fields 510 and 512). As shown in FIG. 5, container size 510 may include multiple data fields with sizes of containers based on electronic information received from apparatus 100. In embodiments, the size of container is then used to determine gas/gas mixture type. As shown in FIG. 5, container type 512 may include multiple data fields with the type of containers, such as the containers made of glass, plastic, zip lock, etc. As shown in FIG. 5, flushing quantities 514 may include multiple data fields about the number of times a particular gas/gas mixtures is injected (e.g. number of times to flush) into a container. For example, the electronic information may indicate injection into a container a selection gas (argon gas) three times or flush a container with 30% argon and 70% nitrogen. In embodiments, computing device 114 may select multiple data fields from a particular column. For example, computing device 114 may select quantity of one from flushing quantities 514 for argon gas and also select a quantity of two from flushing quantities 514 for nitrogen gas. Also, for example, computing device 114 may determine a container has multiple foods inside a container. In embodiments, computing device 114 selects data fields from each column and not necessarily all data fields from a single row. Thus, for example, computing device 114 may determine that the food type is salsa, the food age is a day old, the type of gas is argon, the container size is 6 ounces, container is made of glass, and the gas should be flushed (e.g., injected) one time into the container. While FIG. 5 shows a particular number of data fields, database 500 may include additional data fields within each column.

Figure 6:
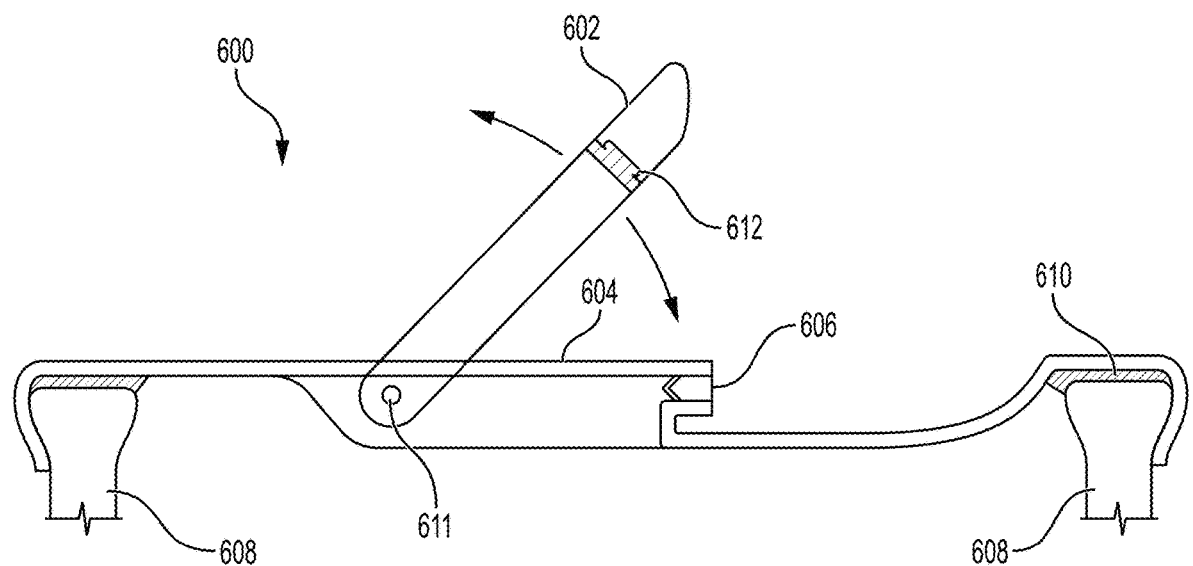
FIGS. 6 and 7 are diagrams of an example container system.

FIG. 6 shows a diagram of an example container system 600 as viewed from a side perspective. As shown in FIG. 6, container system 600 includes cap arm 602, lid area 604, fill port 606, container 608, rubber gasket 610, hinge 611, and rubber seal 612. In embodiments, the container lid (cap arm 602, lid area 604, fill port 606, exhaust port 618 shown in FIG. 7, and rubber gasket 610) is placed above container 608. In embodiments, the container lid may be made of plastic, metal, or a mix of different materials. In embodiments, container 608 may be a container that can be used to contain food. In embodiments, cap arm 602 is a rotatable arm that moves up and down (based on hinge 611) such that when the rotatable arm is in the down position, cap arm 602 covers fill port 606 and, along with lid area 604, totally protects the food inside container 608. In embodiments, cap arm 602 is moved in the up position when container system 600 is placed in receiving section 112 and receiver arm 800 pushes cap arm 602 up to allow gas from tank 122 via fill port 606 to enter container 608. In embodiments, cap arm 602 has hinge 611 which allows cap arm 602 to be connected to lid area 604 and permits the movement of cap arm 602. In embodiments, rubber gasket 610 is used to create a seal between container 608 and container lid 610 to ensure that no air/gas exists from container 608. In embodiments, rubber seal 612 covers fill port 606 when cap arm 602 is in the down position.

Figure 7:
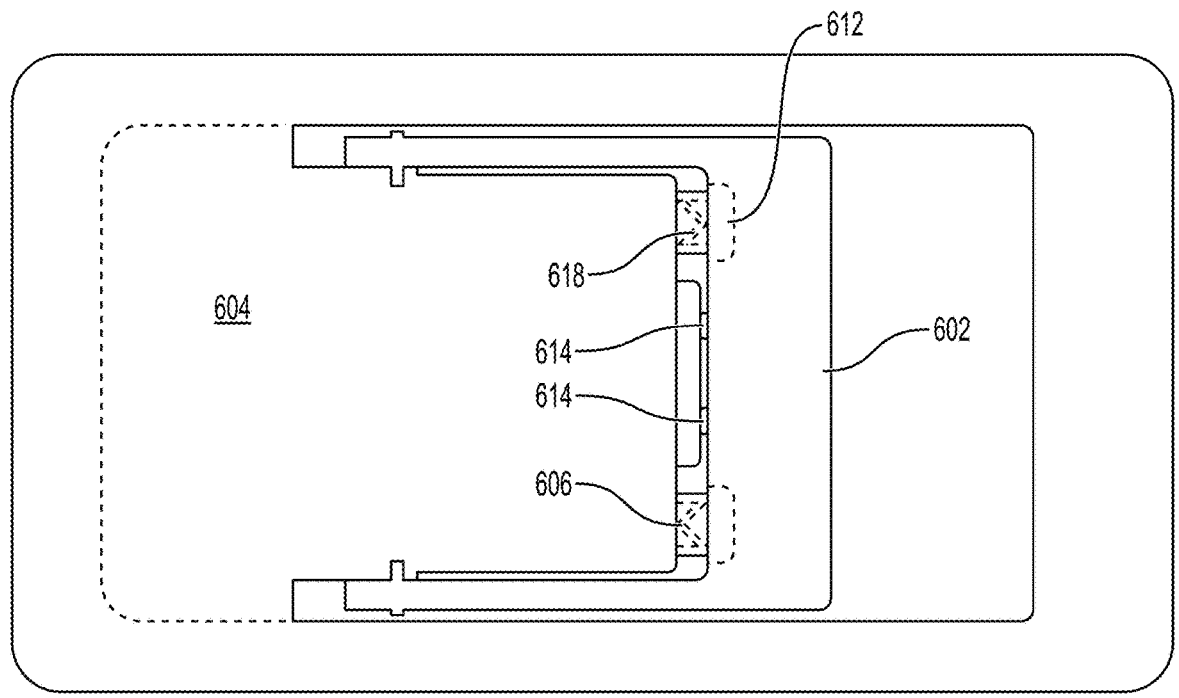

FIG. 7 shows another diagram of container system 600 as shown from a top perspective. FIG. 7 further shows pop-in nubs 614 which are used in conjunction with pop-in nub receivers 616 (shown in FIG. 10) to hold cap arm 602 tightly down onto lid area 604. FIG. 7 further shows exhaust port 618 which is used to allow for air, or any other gas, to exhaust from container 608 via the container lid (as described in FIG. 6). While features 614 and 616 are used in this example, in other embodiments, nubs and nub receivers are not needed to hold cap arm 602 down onto lid area 604.

Figure 8A:
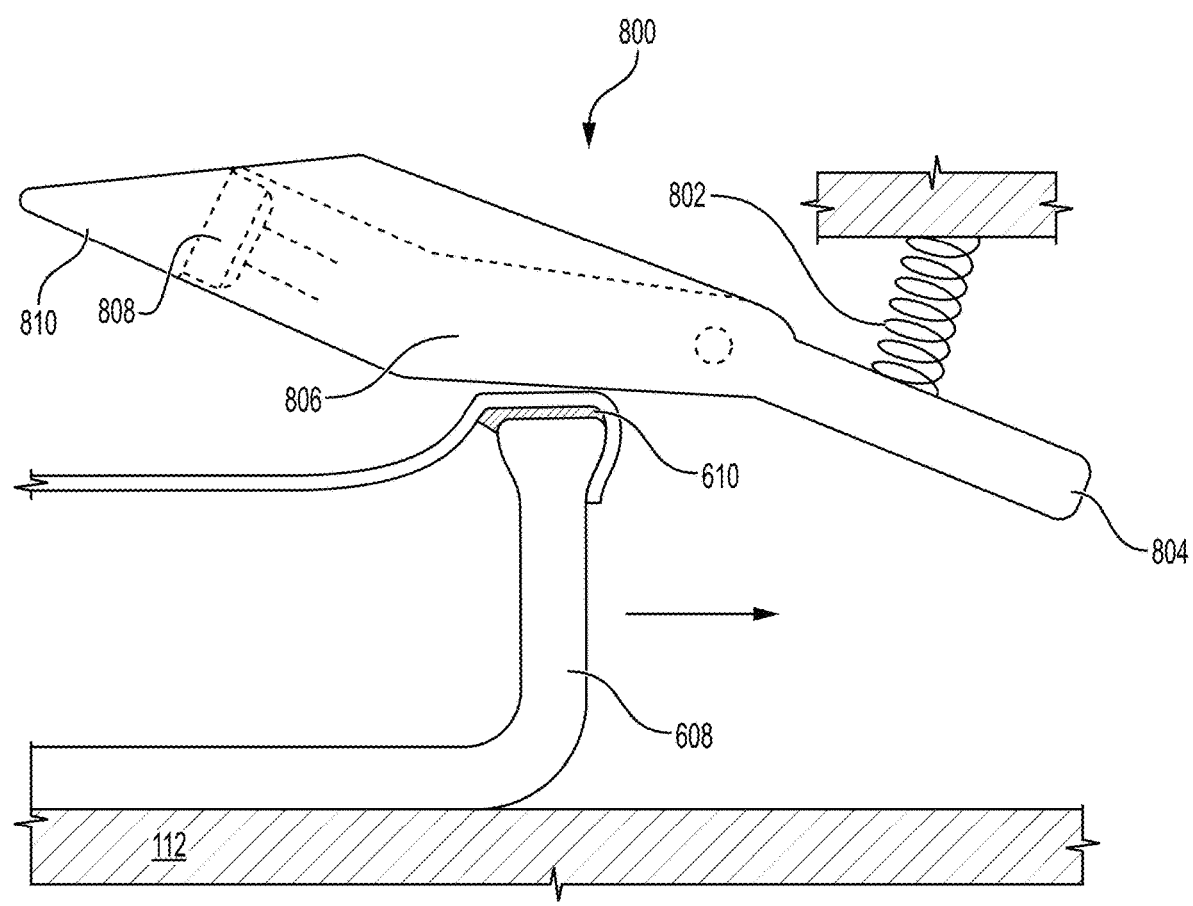
FIGS. 8A and 8B are diagrams of an example receiver arm.
Figure 8B:
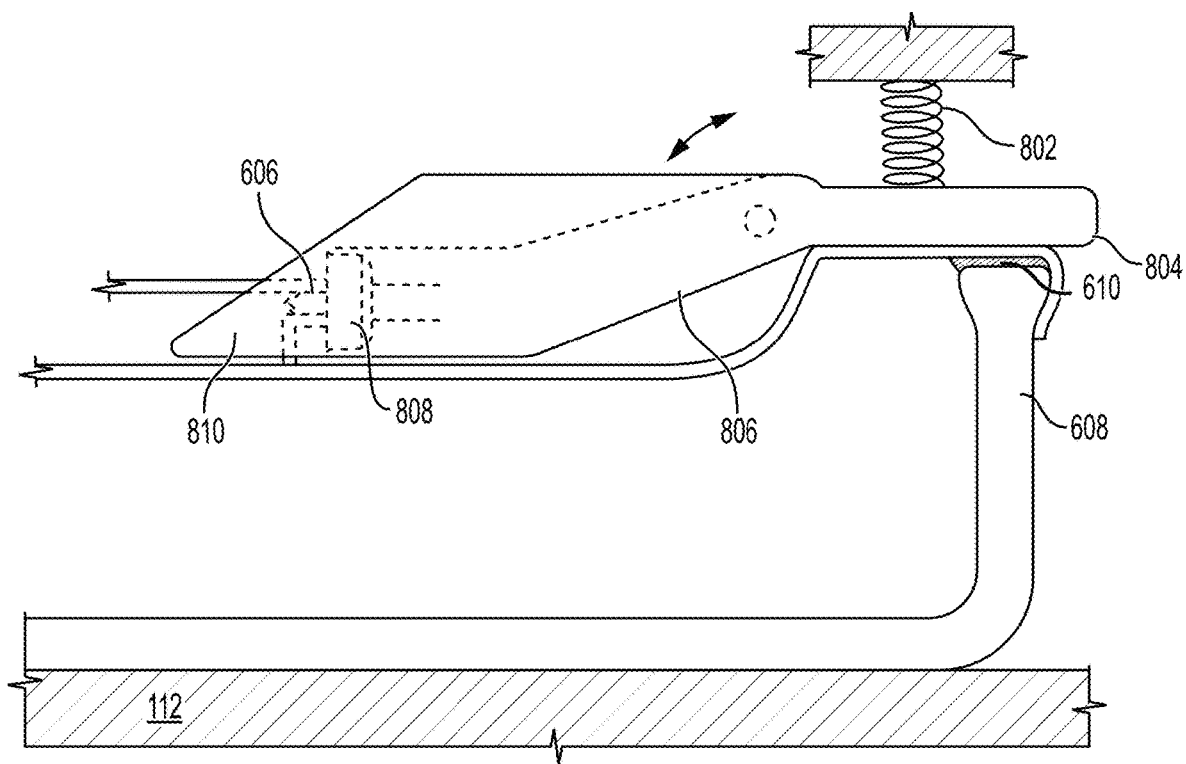

FIG. 8A shows an example receiver arm 800 from a side perspective. As shown in FIG. 8A, receiver arm 800 includes spring 802, paddle 804, body 806, fill port 808, and arm horn 810 In embodiments receiver arm 800 is connected to apparatus 100 via spring 802 and is located in receiving section 112. In embodiments, receiver arm 800 may be constructed of metal, plastic, or a mix of different materials. In embodiments, spring 802 is connected to apparatus 100 in an area of receiving section 112. As shown in FIG. 8A, receiver arm 800 is shown at an angle to the bottom surface of receiving section 112. FIG. 8A also shows a portion of a container (such as container 608 and described in FIG. 6) placed on receiving section 112. FIG. 8B shows receiver arm 800 (from a side perspective) at a different position. In embodiments, receiver arm 800 moves from the position shown in FIG. 8A (at an angle to the bottom surface of receiving section 112) to the position shown in FIG. 8B when a container (such as container 608) is pushed into from outside of receiving section 112 (shown in FIG. 8A) to inside of receiving section 112. As container 608 is pushed further into receiving section 112 the edge area of container 608 pushes against the bottom surface of paddle 804 which results in receiver arm 800 to move down. As container 608 is pushed further into receiving section 112, receiver 800 pushes cap arm 602 of container system 600 away from the rest of the container lid (as described in FIG. 6) so that fill port 606 is exposed which then attaches to fill port 808 on receiver arm 800 thus allowing for gas, or a mixture of gases, to be injected/distributed into container 608 based on the process described in FIG. 4.

Figure 9:
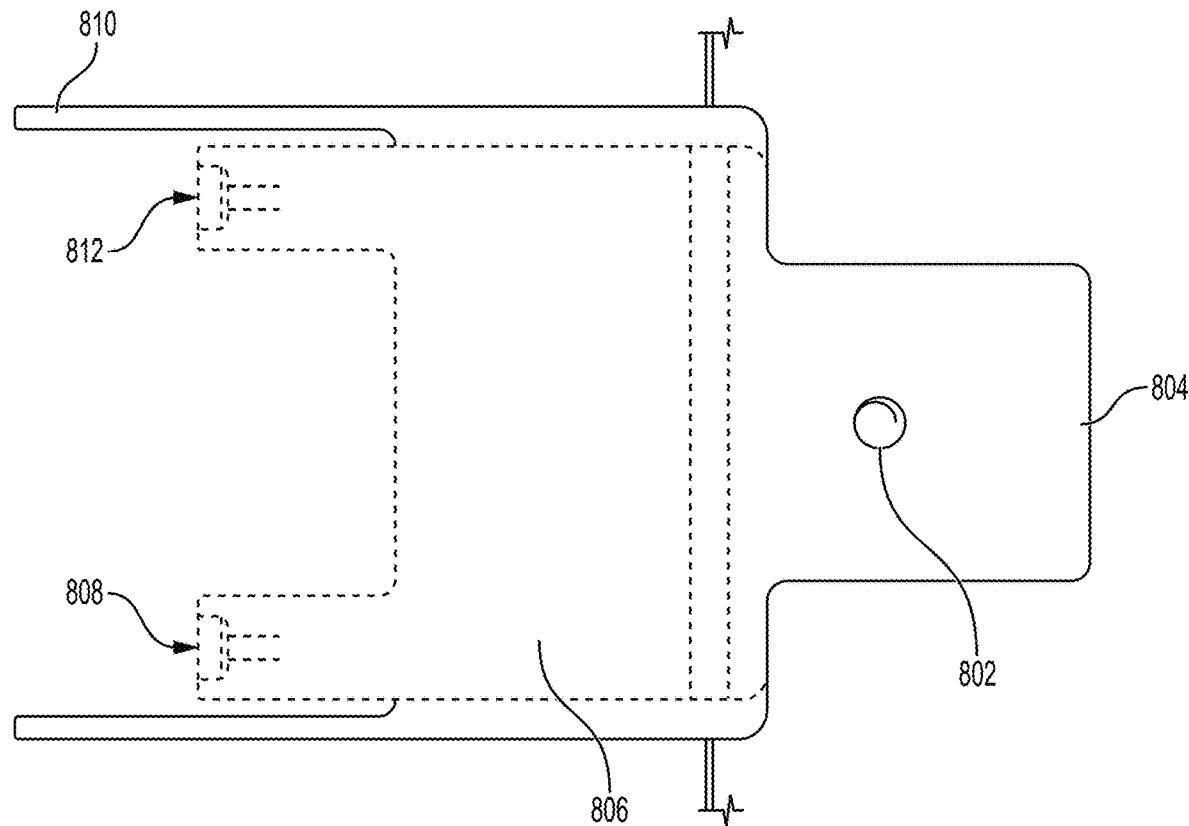
FIG. 9 is a diagram of an example receiver arm.

FIG. 9 describes receiver arm 800 for a top perspective. FIG. 9 shows the features shown in FIGS. 8A and 8B as well exhaust port 812. FIG. 9 shows receiver arm 800 when it is in the position shown in FIG. 8B.

Figure 10:
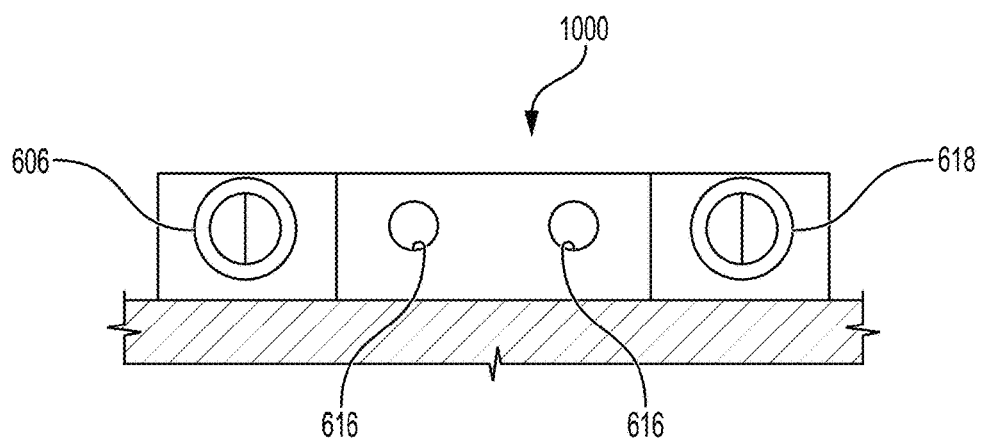
FIG. 10 is a diagram of an example container lid face.

FIG. 10 shows container lid face 1000. In embodiments, container lid face 1000 is a front perspective of container lid (as described in FIG. 6) when cap arm 602 is in an up position such that fill port 606 is exposed for access to gas (or a mix of gases) from apparatus 100 via receiver arm 800. As shown in FIG. 10, container lid face 1000 includes fill port 606, pop-in nub receiver 616, and exhaust port 618. In embodiments, nub 614 (shown in FIG. 7) and pop-in nub receiver 616 are used to ensure that cap arm 602 remains attached to lid area 604. In embodiments, nub 614 may receive another pop-in nub receiver that is attached to lid area 604; and, pop-in nub receiver 616 may receive another nub that is attached to lid area 604. In embodiments, fill port 606 may receive gas/gas mixture from apparatus 100 via fill port 808 (as part of receiver arm 800). In embodiments, exhaust port 618 may exhaust gas from container system 600 through exhaust port 812 (as part of receiver arm 800). In embodiments, the gas exhausting from container system 600 may then exhaust to a container or tank (e.g. tank 122) that holds exhaust gases.

Figure 11:
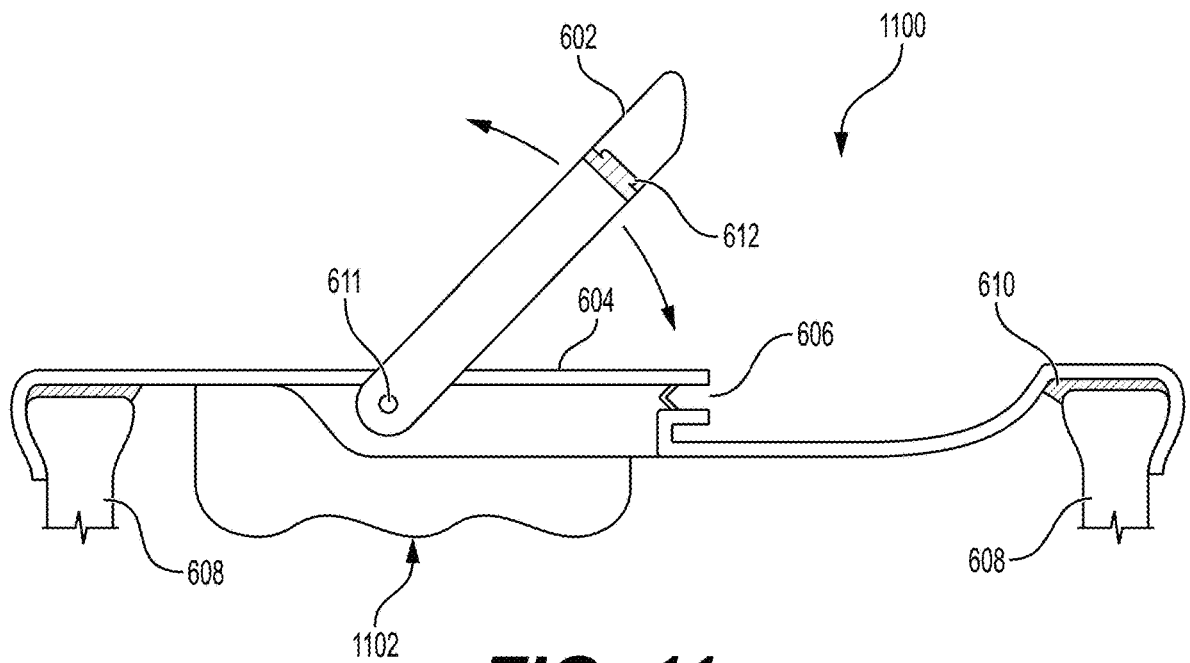
FIGS. 11 and 12 are diagrams of an example container system.
Figure 12:
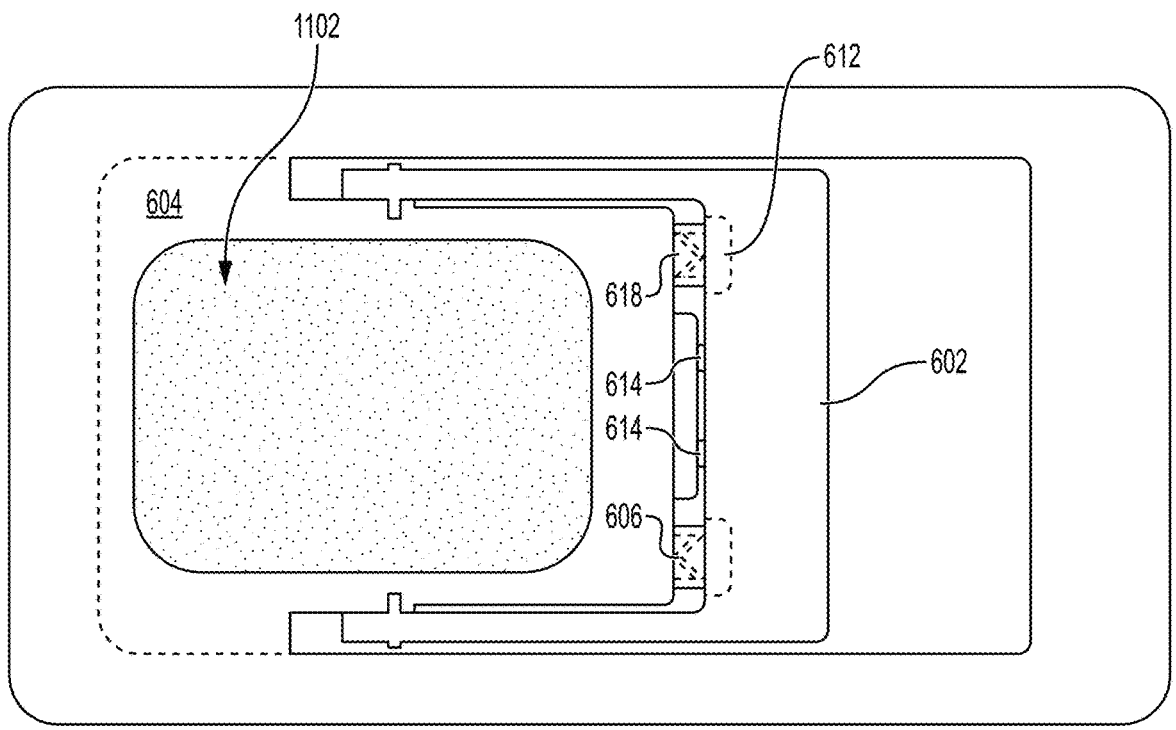

FIGS. 11 and 12 describe container system 1100. As shown in FIG. 11, container system 1100 includes cap arm 602, lid area 604, fill port 606, container 608, rubber gasket 610, hinge 611, and rubber seal 612. In embodiments, the container lid (cap arm 602, lid area 604, fill port 606, exhaust port 618 shown in FIG. 7, and rubber gasket 610) is placed above container 608. In embodiments, the container lid may be made of plastic, metal, or a mix of different materials. In embodiments, container 608 may be a container that can be used to contain food. In embodiments, cap arm 602 is a rotatable arm that moves up and down (based on hinge 611) such that when the rotatable arm is in the down position, the rotatable arm covers fill port 606 and totally protects the food inside container 608. In embodiments, cap arm 602 is moved in the up position when container 608 is placed in receiving section 112 and receiver arm 800 pushes cap arm 602 up to allow gas from tank 122 via fill port 606 to enter container 608. In embodiments, cap arm 602 has hinge 611 which allows cap arm 602 to be connected to lid area 604 and permits the movement of cap arm 602. In embodiments, rubber gasket 610 is used to create a seal between container 608 and container lid 610 to ensure that no air/gas exists from container 608. In embodiments, rubber seal 612 covers fill port 606 when cap arm 602 is in the down position.

In addition, container system 1100 includes reservoir 1102. In embodiments, reservoir 1102 includes a gas that can be used for food preservation. In embodiments, reservoir 1102 eliminates those situations when a food container is placed in a refrigerated area that may result in a reduction of the gas/gas mixture as well as create a pressure differential that causes gas inside to the container to have a lower pressure than air outside the container (and thus resulting in displacement of the gas inside of the container). Thus, reservoir 1102 provides an amount of gas/gas mixture to prevent the creation of a pressure differential inside the container. In embodiments, when container system 1100 receives gas/gas mixture, additional gas/gas mixture is placed into reservoir 1102 to maintain a particular level of gas/gas mixture even after being placed in a refrigerated space.

Figure 13:
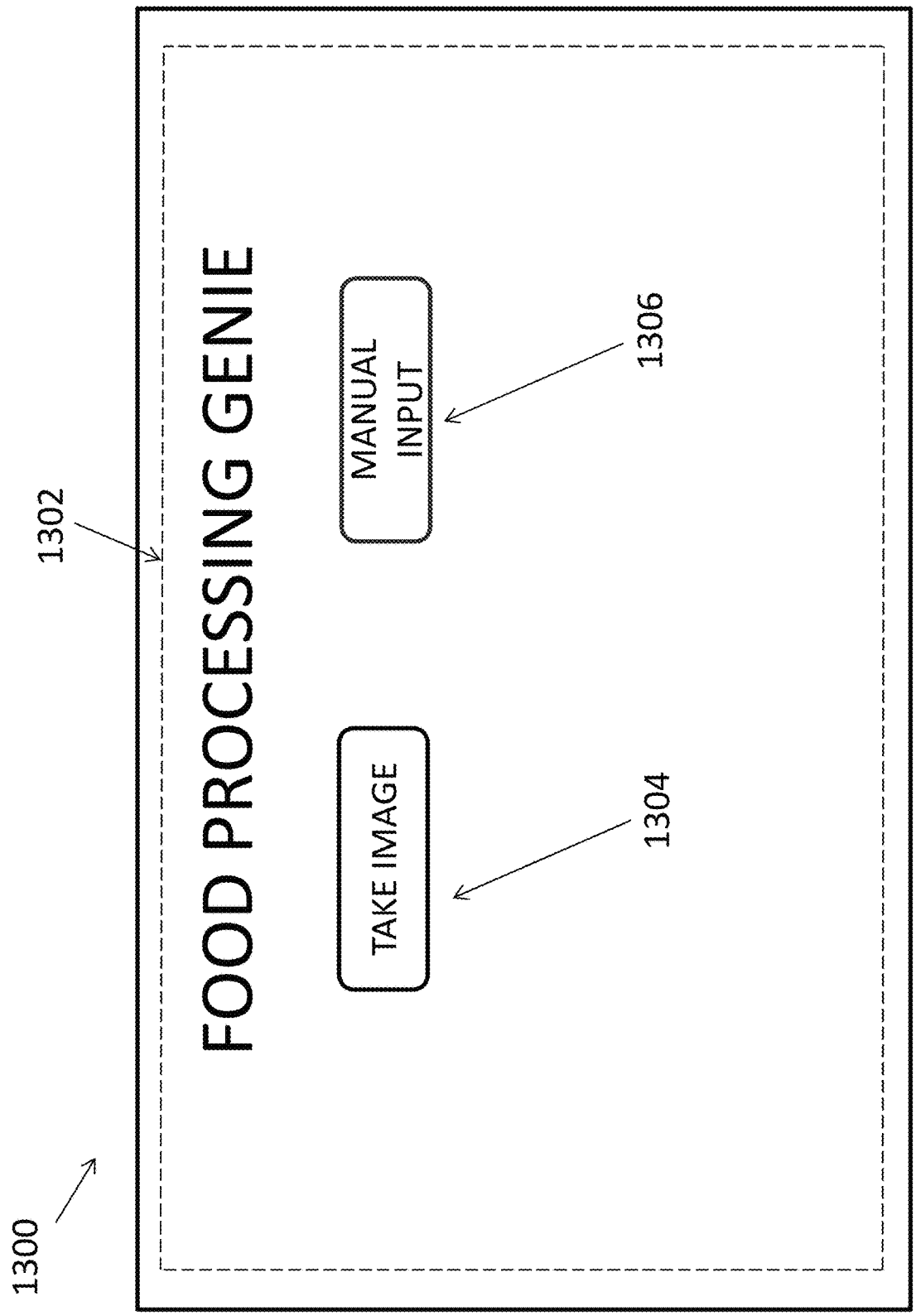
FIGS. 13-18 are diagrams of example processes for preserving food.
Figure 14:
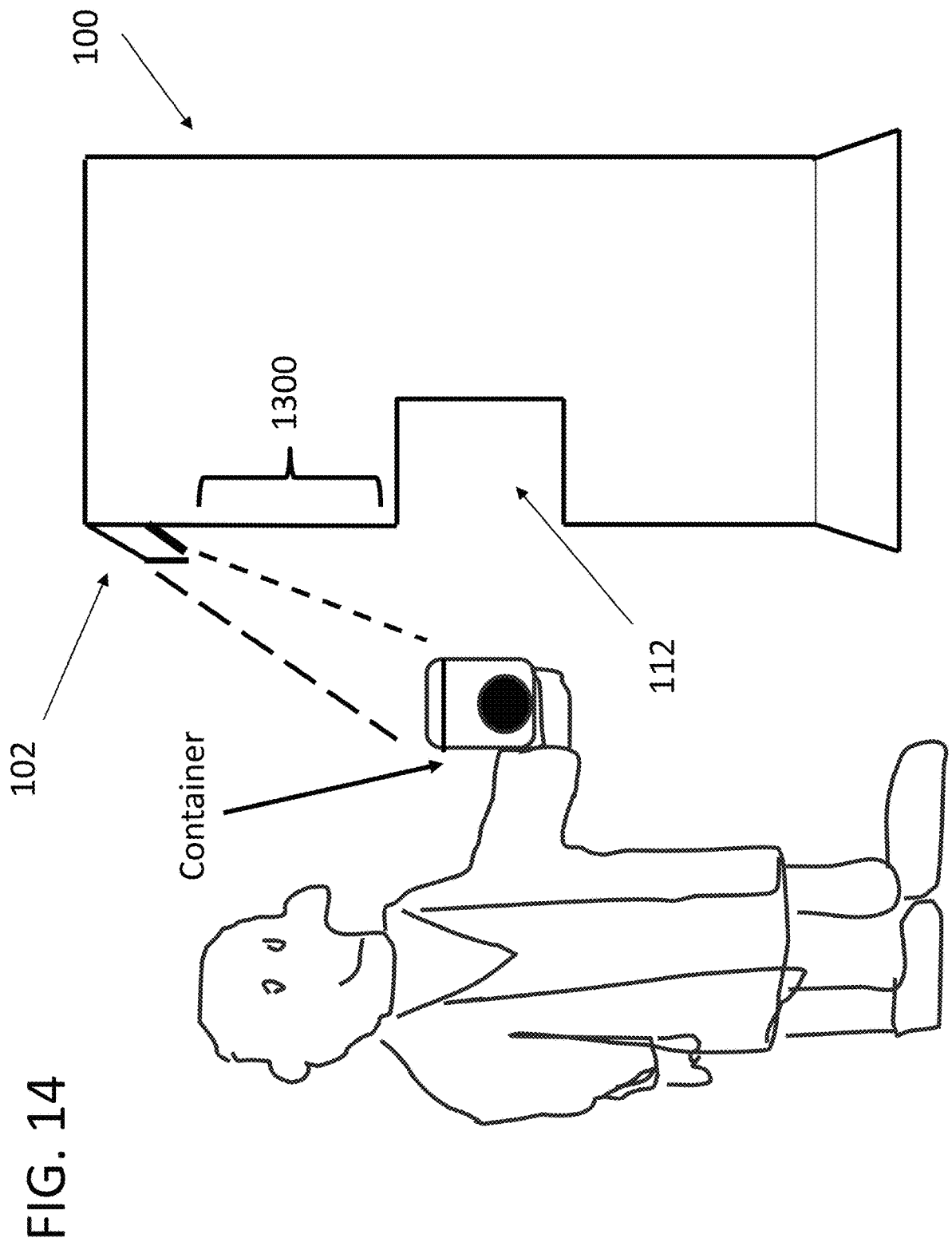

FIGS. 13 to 18 describe examples of how a user interacts with apparatus 100. As shown in FIG. 13, screen 1300 is shown. In embodiments, screen 1300 is similar to screen 106 as described in FIG. 1. As shown in FIG. 13, screen 1300 displays menu 1302 which provides a user of apparatus 100 with two options via two icons—icon 1304 and icon 1306. As shown in FIG. 13, icon 1304, if selected, either by touching screen 1300 or selecting with a key or mouse, is for apparatus 100 to take an image. Accordingly, as shown in FIG. 14, a camera (such as camera 102) associated with apparatus 100 takes the image of the container as it sensed via a motion sensor associated with apparatus 100.

Figure 15:
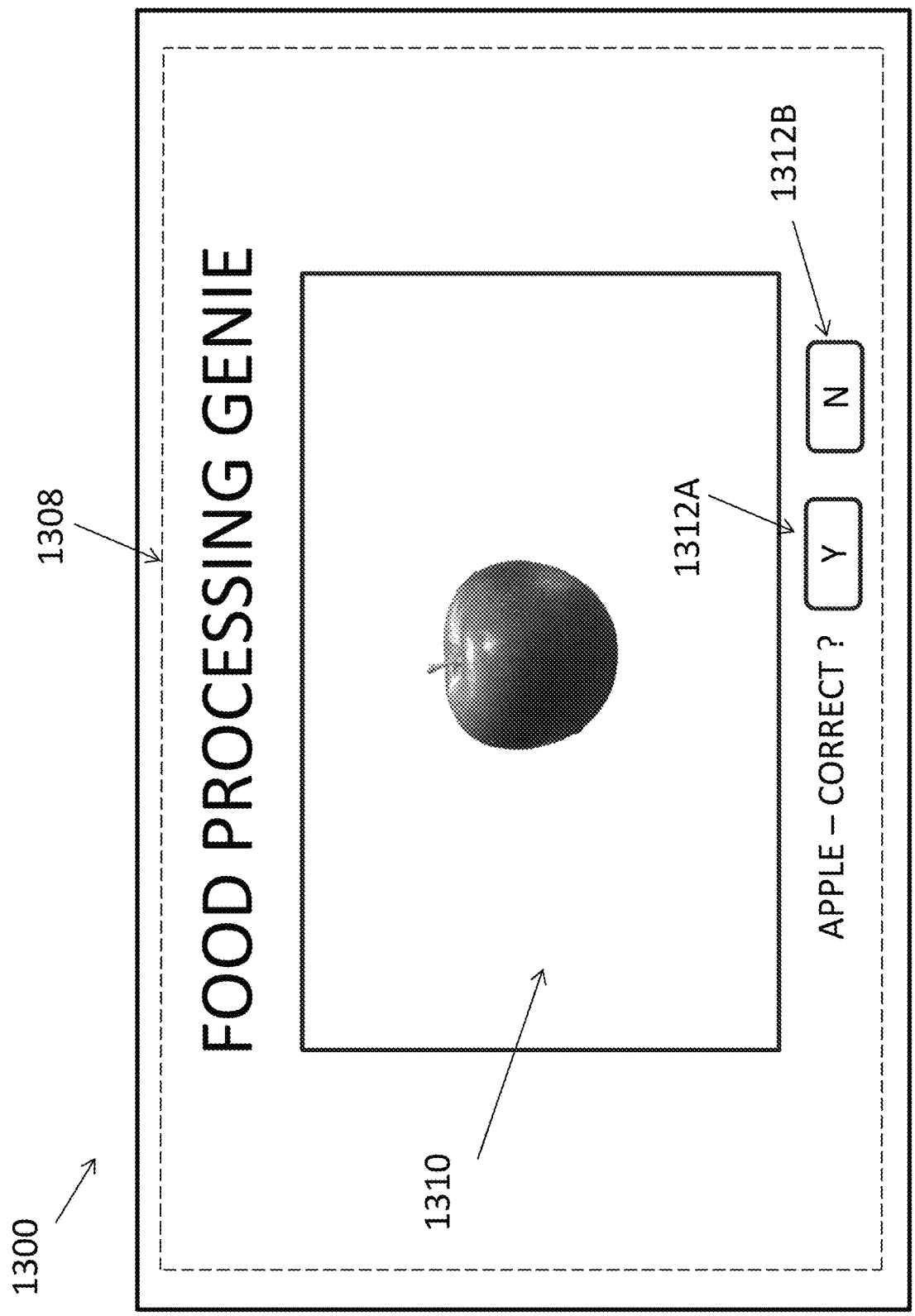
Figure 17:
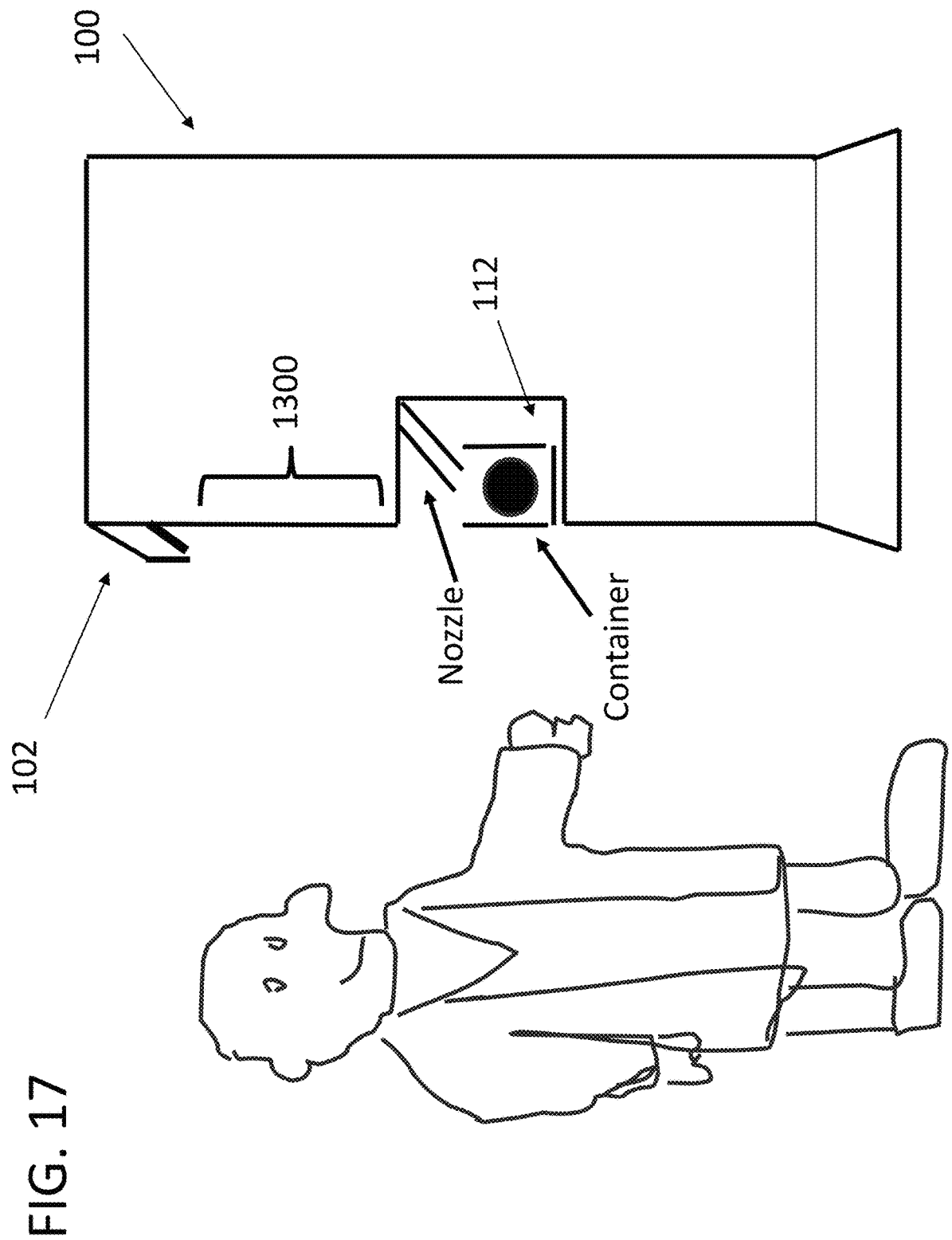

Once the image is taken, apparatus 100 uses computing systems (such as computing system 114) to determine what type of food is shown in the image. As shown in FIG. 15, apparatus 100 determines the type of food and then electronically displays the image on display 1308 as displayed on screen 1300. In this non-limiting example, image 1310 is an apple. Display 1308 also provides icons that request the user to accept the image by selecting "yes" (icon 1312A) or selecting "no" to disagree with the image (icon 1312B). If the user disagrees with the user, then apparatus 100 may take the image again. In this non-limiting example, apparatus 100 generates a message on 1300 that requests the user to place the container onto receiving section 112. As shown in FIG. 17, the user has placed the container (with the lid removed) onto receiving section 112. Also, shown in FIG. 17, a nozzle (which may be similar to receiver arm 800 or may be a rigid or flexible piping) receiving gas/mixture, from one or more gas cylinders, is shown that injects the amount of gas/gas mixture into the container as determined by apparatus 100 based on the size of the container and the type of food (in this case, an apple).

Figure 16:
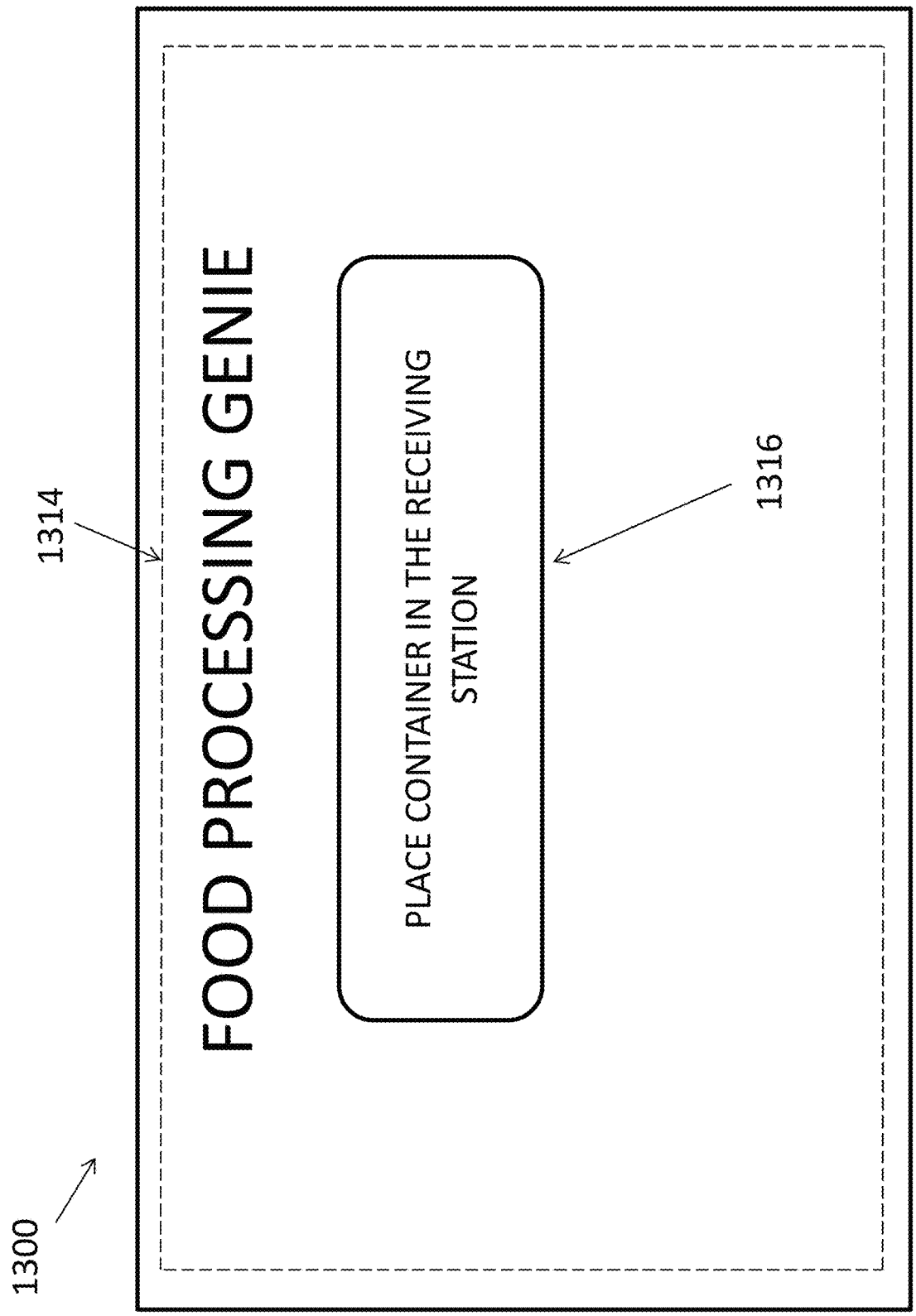
Figure 18:
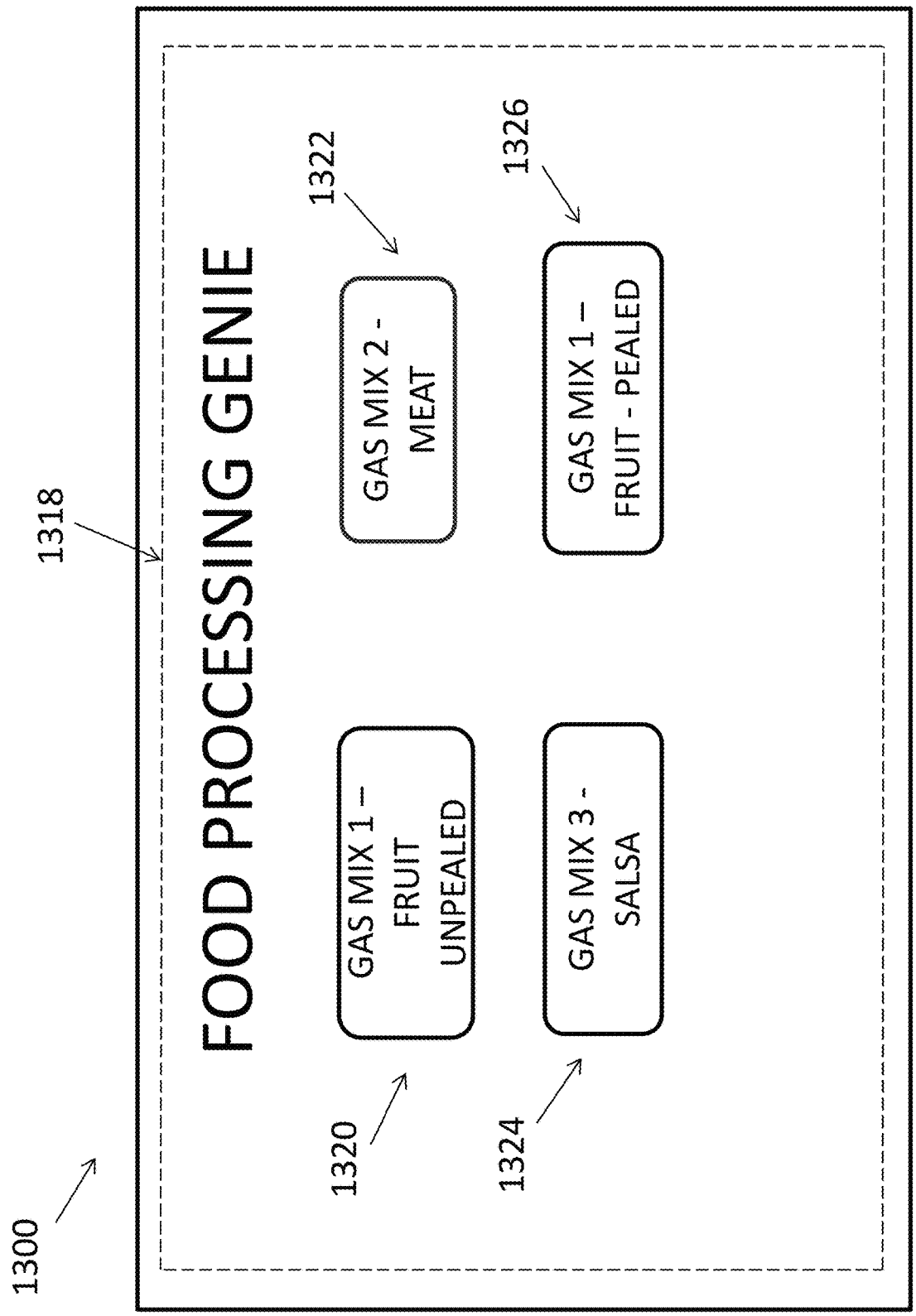

In another example, the user decides to select icon 1306 (instead of icon 1304) and manually provide information for the type of gas/gas mixture. As shown in FIG. 18, display 1314 is shown with message 1316 requesting that the container with the food be placed on apparatus 100. Once the container is placed on container 100 (in an area such as receiving section 112), as shown in FIG. 16, apparatus 100 changes screen 1300 to show display 1318 which includes options 1320, 1322, 1324, and 1326. In embodiments, the various options shown on display 1318 are examples and display 1318 may have less or more options. In this non-limiting example, the user may then select one of the options which will then fill the container with the selected gas/gas mixture.

The above-described examples may be implemented in many different forms of software, firmware, and hardware in the implementations illustrated in the figures. In embodiments, the actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 2, to complete such actions. Also, it will be understood that any of the various actions can result in any type of electronic information to be displayed in real-time and/or simultaneously on multiple devices. For FIG. 4, the order of the blocks may be modified in other implementations. Further, non-dependent blocks may be performed in parallel.

In the preceding specification, food may be any type of food, liquid, mixture of food and liquid, and/or any item that is edible by a person or animal. In the preceding specification, the term gas may describe a single gas or a mixture of gas.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An apparatus, comprising:
    a camera, wherein the camera is attached to a front of the apparatus,
    a motion sensor, wherein the motion sensor is attached to the front of the apparatus and the motion sensor is configured to determine that a particular container is placed onto the apparatus,
    a receiving section, wherein the receiving section is at the front of the apparatus and is located below the camera and the motion sensor,
    gas tanks, wherein the gas tanks are located in an enclosure of the apparatus,
    a graphical user interface screen, and a
    computing device, wherein the computing device is configured to:
        control the camera to take electronic images based on the motion sensor determining that the particular container is placed onto the receiving section,
        determine a type of food placed in the particular container, wherein the camera is configured to determine the type of food when the particular container is placed onto the receiving section, determine an amount of gas and a type of gas to fill the particular container, generate an electronic message to request placement of the particular container onto the receiving section, and inject gas into the particular container, based on the computing device determining the type of food and when the particular container is placed onto the receiving section, wherein the injected gas is configured to be injected via piping attached to one or more of the gas tanks and wherein the injected gas is used to preserve food inside the container; and a receiver arm, wherein the receiver arm is attached to a top portion of the receiving section and is configured to attach to the particular container placed in the receiving section.

2. The apparatus of claim 1, wherein the receiver arm includes:

a paddle attached to a connector that connects the paddle to the receiving section, a receiver arm fill port, and a receiver arm exhaust port, wherein the receiving section is an area of a particular size to hold the particular container.

3. The apparatus of claim 1, further comprising:

a mixing valve, an outbound gas tester, and an inbound gas tester.

4. The apparatus of claim 3, wherein the outbound gas tester is configured to determine how much gas is sent to the particular container.

5. The apparatus of claim 3, wherein the mixing valve is attached to the one or more gas tanks.

6. The apparatus of claim 1, wherein the computing device is configured to receive electronic information from a database.

* * * * *